(12) United States Patent
Xia et al.

(10) Patent No.: US 11,210,051 B2
(45) Date of Patent: Dec. 28, 2021

(54) DISPLAY DEVICE AND OPERATION METHOD THEREOF

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Zengqiang Xia, Beijing (CN); Chao Kong, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/640,408

(22) PCT Filed: Mar. 11, 2019

(86) PCT No.: PCT/CN2019/077700
§ 371 (c)(1),
(2) Date: Feb. 20, 2020

(87) PCT Pub. No.: WO2020/181468
PCT Pub. Date: Sep. 17, 2020

(65) Prior Publication Data
US 2021/0141583 A1     May 13, 2021

(51) Int. Cl.
*G09G 5/14*        (2006.01)
*H01L 27/32*       (2006.01)
(Continued)

(52) U.S. Cl.
CPC .......... *G06F 3/1446* (2013.01); *G06F 1/1605* (2013.01); *G06F 3/1431* (2013.01)

(58) Field of Classification Search
CPC .. G09G 5/14; G09G 3/00; G09G 3/01; G09G 3/16; G09G 3/34; G09G 3/36;
(Continued)

(56) References Cited

U.S. PATENT DOCUMENTS 5,801,758 A * 9/1998 Heirich .................. H04N 7/144
  348/14.08
10,615,239 B2   4/2020 Jin
(Continued)

FOREIGN PATENT DOCUMENTS

CN        202889424 U      4/2013
CN        103401963    *  11/2013
(Continued)

OTHER PUBLICATIONS

Second Chinese Office Action from Chinese Patent Application No. 201980000306.8 dated Jul. 2, 2021.

*Primary Examiner* — Chanh D Nguyen
*Assistant Examiner* — Nguyen H Truong
(74) *Attorney, Agent, or Firm* — Dilworth & Barrese, LLP.; Michael J. Musella, Esq.

(57) ABSTRACT

Disclosed are a display device and an operation method thereof. The display device includes a primary display screen, a secondary display and an optical function processor. The primary display screen has a display surface and includes a transparent region; the secondary display is located at a side of the primary display screen opposite to the display surface of the primary display screen, and is configured to project image light to the transparent region of the primary display screen for displaying in the transparent region; the optical function processor is located at the side of the primary display screen opposite to the display surface of the primary display screen, and is configured to perform the corresponding operation.

20 Claims, 7 Drawing Sheets

(51) Int. Cl.
*G06F 3/14* (2006.01)
*G06F 1/16* (2006.01)

(58) Field of Classification Search
CPC ....... G09G 3/3225; G06F 1/16; G06F 3/0481;
G06F 3/0488; G06K 9/00; G02F 1/1343;
G02F 1/1339; H04N 13/04; H04N 9/31;
H04N 9/47; H04N 7/12; H04N 7/14;
H04N 5/30; H04N 5/225; H04N 5/232;
H04M 1/02; H04M 1/725; G03B 21/26;
G03B 21/28; G03B 23/00; G03B 17/12
See application file for complete search history.

(56) References Cited

U.S. PATENT DOCUMENTS

| | | | | |
|---|---|---|---|---|
| 2008/0297593 | A1* | 12/2008 | Debevec | H04N 13/368 348/51 |
| 2015/0255016 | A1* | 9/2015 | An | G09G 3/3233 345/211 |
| 2016/0011702 | A1 | 1/2016 | Shih | |
| 2019/0384360 | A1* | 12/2019 | Tang | G02F 1/1335 |
| 2019/0394373 | A1* | 12/2019 | Zhang | H04M 1/0264 |
| 2020/0225522 | A1* | 7/2020 | Gao | G06F 1/1686 |
| 2020/0227494 | A1* | 7/2020 | Bae | H01L 27/3248 |

FOREIGN PATENT DOCUMENTS

| | | | |
|---|---|---|---|
| CN | 103401963 | A | 11/2013 |
| CN | 104297987 | A | 1/2015 |
| CN | 20836728 | A | 1/2016 |
| CN | 208386728 | A | 1/2016 |
| CN | 106774689 | A | 5/2017 |
| CN | 107422466 | * | 12/2017 |
| CN | 107422466 | A | 12/2017 |
| CN | 107682489 | * | 2/2018 |
| CN | 108683757 | A | 10/2018 |

* cited by examiner

DISPLAY DEVICE AND OPERATION METHOD THEREOF

TECHNICAL FIELD

Embodiments of the present disclosure relate to a display device and an operation method thereof.

BACKGROUND

With the development and progress of the society, the application of electronic display products is more and more extensive, and the requirements of users for the display effect of electronic display products are also higher and higher. The current electronic display product is usually equipped with a camera module, and in order to pursue a narrow frame and a high screen-to-body ratio to achieve a better display effect, it is necessary to cut a groove or to drill a hole at a position of the display screen corresponding to the camera module, so that external light can enter the camera module.

SUMMARY

At least one embodiment of the present disclosure provides a display device, which includes a primary display screen, a secondary display and an optical function processor. The primary display screen has a display surface and includes a transparent region; the secondary display is located at a side of the primary display screen opposite to the display surface of the primary display screen, and is configured to project image light to the transparent region of the primary display screen for displaying in the transparent region; the optical function processor is located at the side of the primary display screen opposite to the display surface of the primary display screen, and is configured to perform at least one of operations as follows: receiving light beams passing through the transparent region from a display side of the primary display screen, and emitting light beams to the display side of the primary display screen through the transparent region of the primary display screen.

For example, the display device according to at least one embodiment of the present disclosure further includes a switcher. The switcher is located at the side of the primary display screen opposite to the display surface of the primary display screen, and is configured to switch the display device so that the secondary display displays in the transparent region or the optical function processor performs the at least one of operations.

For example, in the display device according to at least one embodiment of the present disclosure, the switcher includes a first mirror. The first mirror is configured to be switchable between a first state and a second state; in the first state, the first mirror is configured to reflect the image light of the secondary display to the transparent region; in the second state, the first mirror is configured to reflect the light beams passing through the transparent region from the display side of the primary display screen to the optical function processor or to reflect the light beams emitted by the optical function processor to the transparent region.

For example, in the display device according to at least one embodiment of the present disclosure, the switcher further includes a second mirror. The second mirror is configured to reflect the image light of the secondary display to a reflecting surface of the first mirror in the first state, so that the image light of the secondary display is further reflected by the first mirror to the transparent region.

For example, in the display device according to at least one embodiment of the present disclosure, a display surface of the secondary display is substantially parallel to the display surface of the primary display screen, and the secondary display is attached to the side of the primary display screen opposite to the display surface of the primary display screen with the display surface of the secondary display facing away from the primary display screen.

For example, in the display device according to at least one embodiment of the present disclosure, the second mirror is disposed at a display side of the secondary display, and a reflecting surface of the second reflecting mirror faces the display surface of the secondary display and forms an angle of approximately 45 degrees with the display surface of the secondary display.

For example, in the display device according to at least one embodiment of the present disclosure, an orthographic projection of the reflecting surface of the first mirror on the primary display screen covers the transparent region; and in the first state, the reflecting surface of the first mirror faces the reflecting surface of the second mirror and forms an angle of approximately 90 degrees with the reflecting surface of the second mirror.

For example, in the display device according to at least one embodiment of the present disclosure, a display surface of the secondary display is perpendicular to the display surface of the primary display screen, and an orthographic projection of the reflection surface of the first reflector on the primary display screen covers the transparent area; in the first state, the reflecting surface of the first reflecting mirror faces the display surface of the secondary display and forms an angle of approximately 45 degrees with the display surface of the primary display screen.

For example, in the display device according to at least one embodiment of the present disclosure, in the second state, the reflecting surface of the first mirror faces the optical function processor and forms an angle of approximately 45 degrees with the display surface of the primary display screen.

For example, the display device according to at least one embodiment of the present disclosure further includes a driver. The driver is configured to rotate the first mirror about a rotation axis to switch the first mirror between the first state and the second state.

For example, in the display device according to at least one embodiment of the present disclosure, the rotation axis is parallel to the reflecting surface of the first mirror and the display surface of the primary display screen.

For example, in the display device according to at least one embodiment of the present disclosure, the rotation axis passes through a center of the first mirror and is perpendicular to the display surface of the primary display screen.

For example, in the display device according to at least one embodiment of the present disclosure, the switcher includes a motion member. The motion member is connected to the secondary display and the optical function processor, and is configured to be switched between a third state and a fourth state; in the third state, the motion member is configured to move the secondary display to a position facing the transparent region and simultaneously move the optical function processor to a position away from the transparent region; and in the fourth state, the motion member is configured to move the optical function processor to the position facing the transparent region and simultaneously move the secondary display to a position away from the transparent region.

For example, in the display device according to at least one embodiment of the present disclosure, the switcher includes a motion member, the motion member is connected to the secondary display, a display surface of the optical function processor faces the transparent region, and the motion member is configured to move the secondary display to a position between the optical function processor and the transparent region or to move the secondary display away from the position between the optical function processor and the transparent region.

For example, in the display device according to at least one embodiment of the present disclosure, the primary display screen and the secondary display are liquid crystal display screens or organic light emitting diode display screens.

For example, in the display device according to at least one embodiment of the present disclosure, the primary display screen and the secondary display are flexible organic light emitting diode display screens.

For example, in the display device according to at least one embodiment of the present disclosure, the primary display screen and the secondary display are two portions of an entire display screen, and the secondary display is bent to the side of the primary display screen opposite to the display surface of the primary display screen.

For example, in the display device according to at least one embodiment of the present disclosure, the optical function processor includes at least one selected from the group consisting of a camera module, a 3D structured light module, a time-of-flight 3D imaging module and an infrared sensing module.

At least one embodiment of the present disclosure provides an operation method of the display device, which includes: driving a region of the primary display screen other than the transparent region to display an image; driving the secondary display to display an image and projecting the image light to the transparent region, so that the image displayed on the transparent region and the image displayed by the region of the primary display screen other than the transparent region are combined to form a complete image; and driving the optical function processor to perform at least one of the operations as follows: receiving light beams passing through the transparent region from the display side of the primary display screen, and emitting light beams to the display side of the primary display screen through the transparent region of the primary display screen.

For example, in the operation method of the display device according to at least one embodiment of the present disclosure, the driving the secondary display to display an image and projecting the image light to the transparent region is performed at a different time from the driving the optical function processor to perform the at least one of the operations.

For example, in the operation method of the display device according to at least one embodiment of the present disclosure, when the optical function processor performs the at least one of the operations, a part or all of the region of the primary display screen other than the transparent region displays the image.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
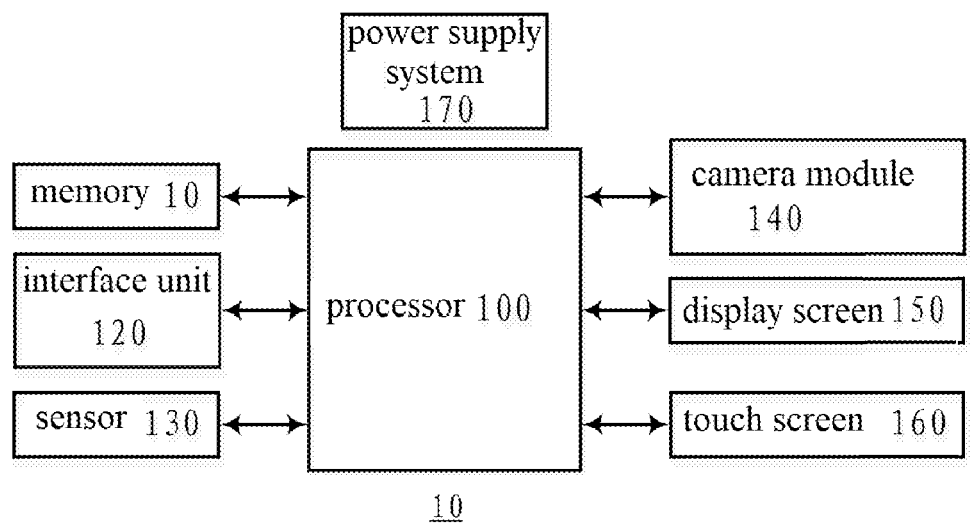
FIG. 1 is a schematic block diagram of a display device according to an embodiment of the disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "a," "an" or "the," etc., are not intended to indicate a limitation of quantity, but rather indicate the presence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Upper", "lower", "left", "right", etc. are only used to indicate the relative positional relationship, and when the absolute position of the object to be described is changed, the relative positional relationship may also change accordingly.

Some embodiments of the present disclosure will be described in detail below with reference to the accompanying drawings. It should be noted that in order to keep the description of the embodiments of the present disclosure clear and concise, detailed descriptions of known functions and known components (members) may be omitted. When any component (member) of the embodiments of the present disclosure appears in more than one drawing, the component (member) is denoted by the same or similar reference numeral in each drawing.

FIG. 1 is a schematic block diagram of a display device provided by at least one embodiment of the present disclosure. The display device 10 includes a processor 100, a memory 110, an interface unit 120, a sensor 130, a camera module 140, a display screen 150 and a touch screen 160, etc. The display device 10 can be any portable display device including, but not limited to, a smart phone, a tablet computer, a media player, etc., and can also include a combination of two or more thereof. It should be noted that the display device 10 is merely one embodiment of the present disclosure, and the display device may have more or fewer components than those shown in FIG. 1, or have different component configurations. The various components shown in FIG. 1 may be implemented in hardware, software, or a combination of hardware and software, including one or a plurality of signal processing circuits and/or application specific integrated circuits.

The processor 100 can include one or a plurality of central processing units (CPU) or other forms of processors having data processing capabilities and/or instruction executing capabilities, and can control other components in the display device 10 to perform desired functions.

The memory 110 can include high-speed random access memory and can also include non-volatile memory, such as one or a plurality of disk storage devices, flash memory devices, or other non-volatile solid-state storage devices. The memory 110 can be configured to store software programs and various data.

The interface unit 120 is configured to connect an external device with the display device 10. For example, the interface unit 120 can include a wired or wireless headset port, an external power supply port (or a battery charging port), etc. The interface unit 120 can be used to receive an input (e.g., data information, power, etc.) from an external device and transmit the received input to one or more components in the display device 10, or can be used to transmit data, etc., between the display device 10 and the external device.

The display device 10 can include at least one sensor 130, such as a distance sensor, a 3D structured light sensor, a time-of-flight (ToF) sensor, and the like. For example, the distance sensor can include an infrared sensing sensor, and the infrared sensing sensor includes an infrared emitter and an infrared detector. In a case where an infrared ray emitted by the infrared emitter is received by the infrared detector, it indicates that an external object approaches the display device 10 (the infrared ray emitted by the infrared emitter is reflected by the external object). In this case, the display device 10 will, for example, automatically turn off the display screen 150 and the touch screen 160, so as to avoid an erroneous operation. The 3D structured light sensor and the time-of-flight (ToF) sensor can be used for face recognition to unlock the display device 10, etc. The display device 10 can also include other sensors, such as an acceleration sensor, a fingerprint sensor, an iris sensor, etc., for realizing corresponding functions. It should be noted that the specific implementation of the sensor in the present disclosure can refer to well-known sensor technologies and details will not be described here again.

The camera module 140 includes, for example, a lens, an image sensor, an image processing chip, etc. An optical image of a scene generated by the lens is projected onto a surface of the image sensor (the image sensor includes CCD or CMOS, etc.) and converted into an electrical signal, the electrical signal is converted into a digital image signal after an analog-to-digital conversion by the image processing chip and then sent to the processor 100 for processing, and an image of the scene is outputted on the display screen 150 instantly. The camera module 140 can include, for example, a front camera module and a rear camera module, wherein the front camera module is usually activated when a user takes a selfie or video call, and the rear camera module is usually activated when the user photographs a scene. In some embodiments, the camera module 140 can include more than one lens.

The display screen 150, also referred to as a display panel, displays a visual output to the user. The visual output can include text, graphics, video, and any combination thereof. The display screen can be configured in common forms such as a liquid crystal display panel, an organic light emitting diode display panel, etc.

The touch screen 160, also referred to as a touch panel, can collect a user's touch operation thereon or nearby and realize predetermined functions according to a preset program. It should be noted that the touch screen 160 may cover the display screen 150. The touch screen 150 converts a detected contact into an interaction with a user interface object such as one or more soft keys displayed on the display screen. Although the touch screen 160 and the display screen 150 are two separate components in the display device 10 shown in FIG. 1, the touch screen 160 and the display screen 150 may be integrated into one component in some other embodiments, without being limited in the present disclosure.

The display device 10 can also include a power supply system 170 for supplying power to various components. The power supply system 170 can include a power management system, one or a plurality of power supplies (e.g., batteries), a charging system, a power failure detection circuit, a power converter or inverter, and any other components associated with power generation, management and distribution in the display device 10.

It should be noted that according to the actual application scenarios of the display device 10, those skilled in the art can set other structures not shown according to the specific application scenarios, or can remove some components or structures as needed, without being limited in the present disclosure.

With the development of science and technology, users pursue the advantages of a display device with a narrow frame and a high screen-to-body ratio. However, the implementation of the functions of some components in the display device (for example, the front camera module in the camera module 140) depends on that the components and the display screen 150 are simultaneously arranged on the front of the display device, thereby affecting the increasing of the screen-to-body ratio of the display device. In order to give consideration to both high screen-to-body ratio and functions of the above components, one scheme is to cut a groove or drill a hole in the display screen 150 and set the above components at the position of the groove or hole. This scheme will reduce the aesthetics of the display screen and also limit a further increase of the screen-to-body ratio.

Another scheme is to use and hide the front camera module through an electric lifting member. Although this scheme realizes a high screen-to-body ratio (full screen), it will destroy the integration of the display device and reduce the waterproof and dustproof performance of the display device.

At least one embodiment of the present disclosure provides a display device, which includes a primary display screen, a secondary display, and an optical function processor. The primary display screen has a display surface and includes a transparent region; the secondary display is located at a side of the primary display screen opposite to the display surface of the primary display screen, and is configured to project image light to the transparent region of the primary display screen for displaying in the transparent region; the optical function processor is located at the side of the primary display screen opposite to the display surface of the primary display screen, and is configured to perform at least one of operations as follows: receiving light beams passing through the transparent region from a display side of the primary display screen; and emitting light beams to the display side of the primary display screen through the transparent region of the primary display screen.

At least one embodiment of the present disclosure further provides an operation method corresponding to the display device described above.

The display device provided by the embodiment of the disclosure can not only display via the transparent region, but also realize the function of the optical function processor via the transparent region, and the optical function processor is in a hidden state all the time. On the one hand, an image displayed by the secondary display can be projected onto the transparent region of the primary display screen, and at the same time, the region of the primary display screen other than the transparent region can display an image; when the images displayed by them at the same time are combined into a complete image, the user will think that the whole primary display screen of the display device is displaying, so that the display device can realize a narrow frame and a high screen-to-body ratio, and processes such as cutting a groove, drilling a hole and the like are not required for the primary display screen, thereby reducing the difficulty of the manufacturing process of the primary display screen and maintaining the aesthetics of the display device. On the other hand, the optical function processor (e.g., the front camera module) can realize a corresponding function through the transparent region of the primary display screen while being kept in a hidden state, thereby maintaining the integration and the waterproof and dustproof performance of the display device.

The display device and the operation method thereof according to at least one embodiment of the present disclosure will be described in detail below with reference to the accompanying drawings.

Figure 2:
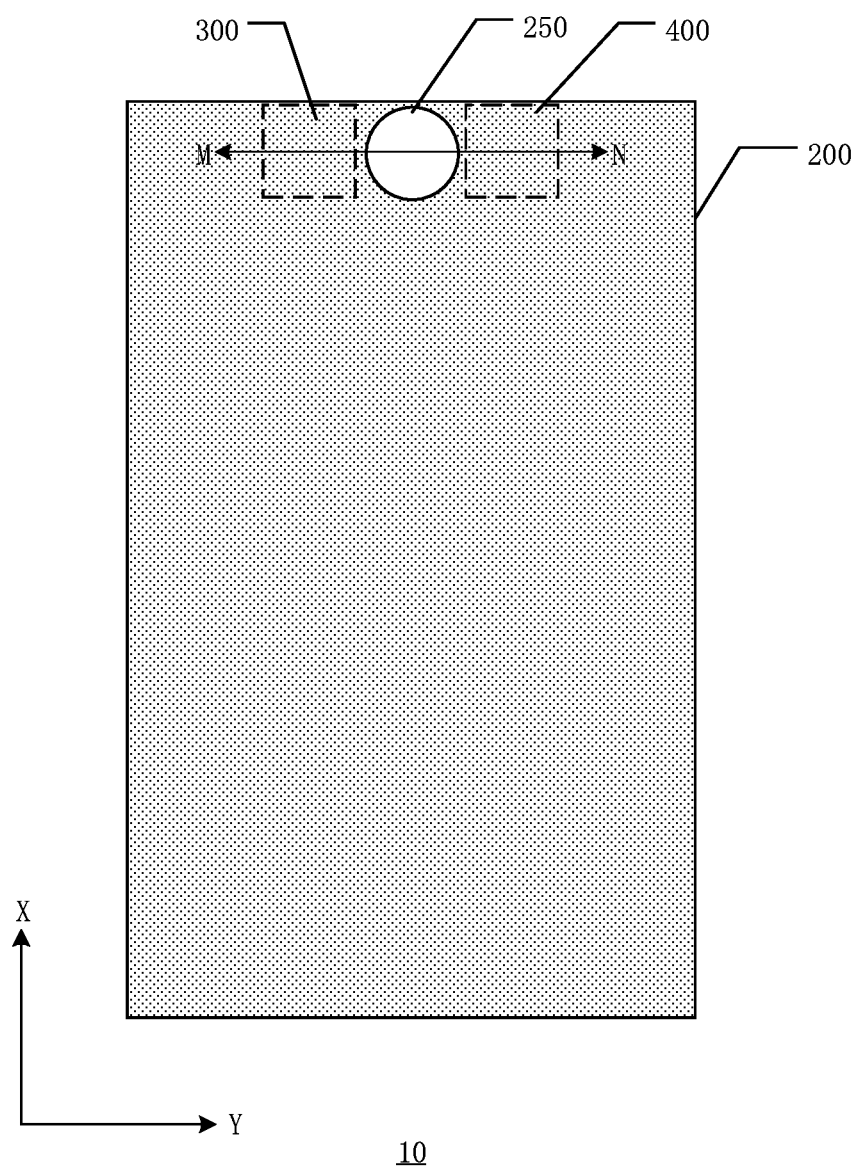
FIG. 2 is a schematic plan view of a display device according to an embodiment of the present disclosure.

FIG. 2 is a schematic plan view of a display device according to an embodiment of the present disclosure. As shown in FIG. 2, the display device 10 includes a primary display screen 200, a secondary display 300, and an optical function processor 400. The primary display screen 200 has a display surface and includes a transparent region 250. For example, the display surface of the primary display screen 200 can display for viewing by a user. For example, the side at which the display surface of the primary display screen 200 is located is referred to as the display side of the primary display screen 200. The secondary display 300 is disposed on a side of the primary display screen 200 opposite to the display surface of the primary display screen 200, and is configured to project image light to the transparent region 250 of the primary display screen 200 for displaying in the transparent region 250. The optical function processor 400 is disposed at the side of the primary display screen 200 opposite to the display surface the primary display screen 200, and is configured to perform at least one of operations as follows: receiving light beams passing through the transparent region 250 from the display side of the primary display screen 200; and emitting light beams to the display side of the primary display screen 200 through the transparent region 250 of the primary display screen 200. For example, the display surface of the primary display screen 200 is shown in FIG. 2, and the secondary display 300 and the optical function processor 400 are shown by dashed lines, indicating that they are located at the side of the primary display screen 200 opposite to the display surface of the primary display screen 200.

For example, in the display device provided by at least one embodiment of the present disclosure, a region (shaded region) of the primary display screen 200 other than the transparent region 250 includes a display region, and the display region includes a pixel structure, data lines, scan lines, etc., (not shown in FIG. 2) for displaying an image, while the transparent region 250 does not include such pixel structure, data lines, scan lines, etc., for displaying an image. That is, the transparent region 250 can transmit light but does not display an image itself. For example, the transparent region 250 can be disposed at an edge of the display region or can be disposed inside the display region, that is, the transparent region 250 is surrounded by the display region.

For example, the transparent region 250 and the display region of the primary display screen 200 may jointly form a rectangular region, so that the primary display screen 200 and the secondary display 300 can jointly display images in the rectangular region. However, the embodiment of the present disclosure is not limited thereto, and the region jointly formed by the transparent region 300 and the display region of the primary display screen 200 can be rounded rectangular, circular, oval, regular polygonal or of other irregular shapes, without being particularly limited in the embodiment of the present disclosure.

For example, in the display device provided by at least one embodiment of the present disclosure, the shape and size of the transparent region 250 are not limited, as long as the optical function processor 400 can successfully perform the above operations to realize the functions of the optical function processor 400 without being affected. For example, in a case where the optical function processor 400 is a front camera module, the shape of the transparent region 250 can be similar to the shape of the lens of the front camera module (e.g., a circle), or can be other shapes such as a square. The size of the transparent region 250 can be the same as the size of the cross-section of the lens of the front camera module, or can be greater than the size of the cross-section of the lens of the front camera module, so as to ensure that the clear aperture of the lens of the front camera module is not limited by the transparent region 250. It should be noted that the shape of the transparent region 250 can be continuous or discontinuous. For example, when the front camera module has a plurality of lenses, the shape of the transparent region 250 may be a plurality of graphics corresponding to the plurality of lenses or a large graphic sufficient to include the plurality of graphics corresponding to the plurality of lenses.

For example, in the display device provided by at least one embodiment of the present disclosure, an image displayed by the secondary display 300 through the transparent region 250 can be combined with an image displayed in the region of the primary display screen 200 other than the transparent region 250 (i.e., the display area of the above-mentioned main display 200), so as to display a complete image together. For example, the secondary display 300 displays a first part of a frame of complete image, and the first part of the frame of complete image displayed by the secondary display 300 is projected onto the transparent region 250 for display, and combined with a second part of the frame of complete image displayed in the display region of the primary display screen 200, so that the user can view the frame of complete image on the display side of the primary display screen 200.

For example, in the display device provided by at least one embodiment of the present disclosure, the shape and size of the secondary display 300 are not limited, as long as the user can view the complete image described above from the primary display screen 200 without being affected. For example, the shape and size of part or all of a display region of the secondary display 300 are the same as the shape and size of the transparent region 250. The part or all of the display region of the secondary display 300 displays the first part of the frame of complete image, which can be projected onto the transparent region 250 for display. For example, in some examples, the secondary display 300 can be a secondary display screen similar to the primary display screen 200; for example, in some examples, the secondary display can be a projection equipment having a projection function.

For example, in the display device provided by at least one embodiment of the present disclosure, as shown in FIG. 2, projections of the secondary display 300 and the optical function processor 400 on the primary display screen 200 are substantially on a same straight line as the transparent region 250, and are distributed on both sides of the transparent region 250. It should be noted that the position settings of the secondary display 300 and the optical function processor 400 with respect to the transparent region 250 is not limited to this case, for example, they may be changed according to the position of the transparent region 250 on the primary display screen 200, as long as the technical effects of the display device in the present disclosure can be realized.

For example, the display device provided by at least one embodiment of the present disclosure further includes a switcher (not shown in FIG. 2). The switcher is located at the side of the primary display screen 200 opposite to the display surface of the primary display screen 200, and is configured to switch the display device so that the secondary display 300 displays in the transparent region 250 or the optical function processor 400 performs the above-mentioned operations. For example, the switcher can, via optical path conversion, project the image light of the secondary display 300 to the transparent region 250, and can, via optical path conversion, transmit light beams passing through the transparent region 250 from the display side of the primary display screen 200 to the optical function processor 400 or transmit light beams emitted from the optical function processor 400 through the transparent region 250 to the display side of the primary display screen 200.

Although the above embodiment has been described by taking that the display device includes a switcher as an example, the positions of the secondary display 300 and the optical function processor 400 can be set so that they can simultaneously realize corresponding operations. That is, the optical function processor 400 receives or emits light beams through the transparent region while the secondary display 300 displays an image in the transparent region. For example, the image light of the secondary display 300 can be projected onto the transparent region in a direction inclined with respect to the display surface of the primary display screen, and the light emitted or received by the optical function processor 400 can propagate in a direction inclined with respect to the display surface of the primary display screen.

Figure 3A:
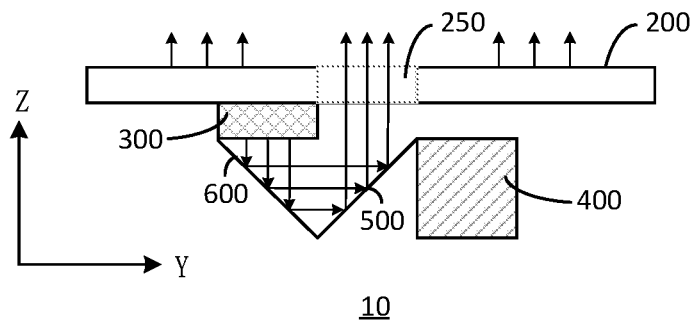
FIG. 3a is a schematic cross-sectional view of a display device in a first state taken along direction M-N in FIG. 2 according to an embodiment of the present disclosure.
Figure 3B:
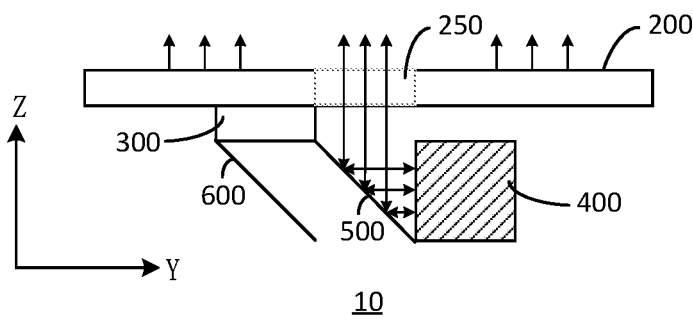
FIG. 3b is a schematic cross-sectional view of the display device shown in FIG. 3a in a second state.

FIG. 3a is a schematic cross-sectional view of a display device in a first state taken along direction M-N in FIG. 2 according to an embodiment of the present disclosure, and FIG. 3b is a schematic cross-sectional view of the display device shown in FIG. 3a in a second state. For example, the first state is a state in which the secondary display 300 displays in the transparent region 250, and the second state is a state in which the optical function processor 400 performs a corresponding operation through the transparent region 250.

As shown in FIGS. 3a and 3b, the switcher includes a first mirror 500. The first mirror 500 is configured to be switchable between a first state and a second state; in the first state, as shown in FIG. 3a, the first mirror 500 is configured to reflect image light of the secondary display 300 to the transparent region 250; in the second state, as shown in FIG. 3b, the first mirror 500 is configured to reflect light beams passing through the transparent region 250 from the display side of the primary display screen 200 to the optical function processor 400 or to reflect light beams emitted by the optical function processor 400 to the transparent region 250. For example, the first mirror 500 can reflect light beams perpendicular to the primary display screen 200 to be parallel to the primary display screen 200, and according to the principle of light path reversibility, the first mirror 500 can also reflect light beams parallel to the primary display screen 200 to be perpendicular to the primary display screen 200. Therefore, as long as the image light emitted by the secondary display 300 can be parallel to the primary display screen 200 and the optical function processor 400 can receive or emit light beams parallel to the primary display screen, the technical effects of the display device can be realized.

For example, in the display device provided by at least one embodiment of the present disclosure, as shown in FIG. 3a, the switcher further includes a second mirror 600. The second mirror 600 is configured to reflect the image light of the secondary display 300 to a reflecting surface of the first mirror 500 in the first state, and then the image light of the secondary display 300 is further reflected by the first mirror 500 to the transparent region 250. For example, the image light of the secondary display 300 is transmitted perpendicular to the transparent region 250 after being twice reflected by the second mirror 600 and the first mirror 500, so that the user can view the image displayed by the secondary display 300 (e.g., the first part of the frame of complete image described above) through the transparent region 250 at the display side of the primary display screen 200.

For example, in the display device provided by at least one embodiment of the present disclosure, as shown in FIG. 3a, a display surface of the secondary display 300 is substantially parallel to the display surface of the primary display screen 200, and the secondary display 300 is attached to the side of the primary display screen 200 opposite to the display surface of the primary display screen 200 with the display surface of the secondary display facing away from the primary display screen 200. Therefore, the display surface of the secondary display 300 can emit image light perpendicular to the primary display screen 200. It should be noted that in the embodiment of the present disclosure, "substantially parallel to" includes "strictly parallel to" and "not parallel to but have an included angle within 3 degrees therebetween".

For example, as shown in FIG. 3a, the second mirror 600 is disposed at the display side of the secondary display 300, and the reflecting surface of the second mirror 600 faces the display surface of the secondary display 300 and forms an angle of approximately 45 degrees with the display surface of the secondary display 300. Therefore, the second mirror 600 can change the image light emitted by the secondary display 300 perpendicular to the primary display screen 200 to be parallel to the primary display screen 200. It should be noted that in the embodiment of the present disclosure, an approximate angle allows a deviation of, for example, ±3 degrees, and the following are the same as this case and details will not be repeated.

For example, as shown in FIG. 3a, the first mirror 500 is disposed at the side of the primary display screen 200 opposite to the display surface of the primary display screen 200, and an orthographic projection of the reflecting surface of the first mirror 500 on the primary display screen 200 covers the transparent region 250 of the primary display screen 200; and in the first state, the reflecting surface of the first mirror 500 faces the reflecting surface of the second mirror 600 and forms an angle of approximately 90 degrees with the reflecting surface of the second mirror. In this case, the reflecting surface of the first reflecting mirror 500 is at an angle of approximately 45 degrees with the display surface of the primary display screen 200. Therefore, the first mirror 500 can reflect the image light parallel to the primary display screen 200 after being reflected by the second mirror 600 into the image light perpendicular to the primary display screen 200 and project it onto the transparent region 250, so that the user can view the image displayed by the secondary display 300 through the transparent region 250 on the display side of the primary display screen 200, such as the first part of the frame of complete image described above. In this case, if the display region of the primary display screen 200 simultaneously displays the second part of the frame of complete image, the user can view the frame of complete image.

Figure 4A:
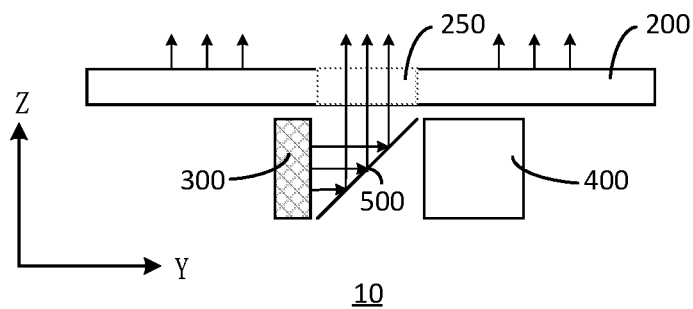
FIG. 4a is a schematic cross-sectional view of a display device in a first state according to another embodiment of the present disclosure.
Figure 4B:
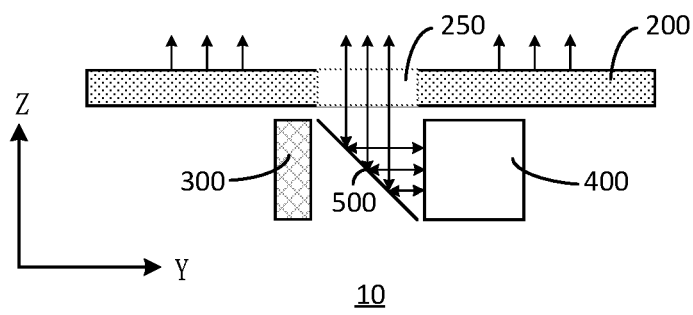
FIG. 4b is a schematic cross-sectional view of the display device shown in FIG. 4a in a second state.

It should be noted that although the above embodiment shows two mirrors, i.e., the first mirror 500 and the second mirror 600, the embodiment of the present disclosure is not limited thereto. For example, in a case where the relative positional relationship between the secondary display 300 and the first mirror 500 is adjusted, only the first mirror 500 may be included as long as the image light of the secondary display 300 can be transmitted to the transparent region 250 for display. FIG. 4a is a schematic cross-sectional view of a display device in a first state according to another embodiment of the disclosure, and FIG. 4b is a schematic cross-sectional view of the display device shown in FIG. 4a in a second state. For example, in the display device 10 in the first state shown in FIG. 4a, the arrangement of the first mirror 500 is the same as that shown in FIG. 3a, and FIG. 4a differs from FIG. 3a in that the display surface of the secondary display 300 is perpendicular to the display surface of the primary display screen 200 and faces the reflecting surface of the first mirror 500, so that the image light of the secondary display 300 can be directly reflected by the first mirror 500 and projected onto the transparent region 250.

It should be noted that for the embodiment of FIGS. 4a and 4b, other components can be referred to the description of the embodiment of FIGS. 3a and 3b, except for the difference from the embodiment of FIGS. 3a and 3b.

For example, in the display device provided by at least one embodiment of the present disclosure, the first mirror 500 can be switched from the first state to the second state. For example, the first mirror 500 can be switched from the first state as shown in FIG. 3a to the second state as shown in FIG. 3b. In the second state, the reflecting surface of the first reflecting mirror 500 faces the optical function processor 400 and forms an angle of approximately 45 degrees with the display surface of the primary display screen. In this case, the optical function processor 400 can receive or emit light beams parallel to the primary display screen 200 to realize the functions of the optical function processor 400. For example, in a case where the optical function processor 400 is a front camera module, the lens of the front camera module faces the reflecting surface of the first reflector 500 in the second state to receive light beams parallel to the primary display screen 200.

For example, in a display device provided by at least one embodiment of the present disclosure, the first mirror 500 is switched between a first state (e.g., as shown in FIG. 3a) and a second state (e.g., as shown in FIG. 3b) in a manner of rotating about a rotation axis. For example, the first mirror 500 can be driven to rotate about a rotation axis by an electric motor or the like. It should be noted that the rotation axis is introduced to describe the rotation manner of the first mirror 500, and may not be a real structure or component. Of course, in some examples, there may also be a real structure or component corresponding to the rotation axis, without being limited in the present disclosure.

For example, in the display device provided by at least one embodiment of the present disclosure, the rotation axis can be parallel to the reflecting surface of the first mirror 500 and the display surface of the primary display screen 200. For example, for the display device shown in FIG. 3a, an extension direction of the rotation axis is perpendicular to the Y axis and the Z axis shown in FIG. 3a, and the rotation axis passes through the center of the first mirror 500, so that the first mirror 500 can be rotated about the rotation axis by an angle of approximately 90 degrees to switch between the first state shown in FIG. 3a and the second state shown in FIG. 3b. It should be noted that, it is illustrative that the secondary display 300 and the optical function processor 400 shown in FIGS. 3a and 3b are adjacent to the transparent region 250 in the direction of the Y axis. For example, in some embodiments, in order to facilitate smooth rotation of the first mirror 500 to switch between the first state and the second state, there may be an appropriate gap from the secondary display 300 and the optical function processor 400 to the transparent region 250.

For example, in the display device provided by at least one embodiment of the present disclosure, the rotation axis can also pass through the center of the first mirror 500 and be perpendicular to the display surface of the primary display screen 200 (e.g., perpendicular to the X axis and the Y axis shown in FIG. 2). For example, when the first mirror 500 as shown in FIG. 3a rotates about the rotation axis, the reflecting surface of the first mirror 500 is always at an angle of approximately 45 degrees with the display surface of the primary display screen 200. For example, for the display device shown in FIG. 3a, the first mirror 500 can be rotated about the rotation axis by an angle of approximately 180 degrees to switch between the first state and the second state.

It should be noted that, the configuration in which the rotation axis of the first mirror 500 passes the center of the first mirror 500 and is perpendicular to the display surface of the primary display screen 200, can also be applied to a case where the projections of the secondary display 300 and the optical function processor 400 on the primary display screen 200 are not in the same straight line as the transparent region 250.

Figure 5:
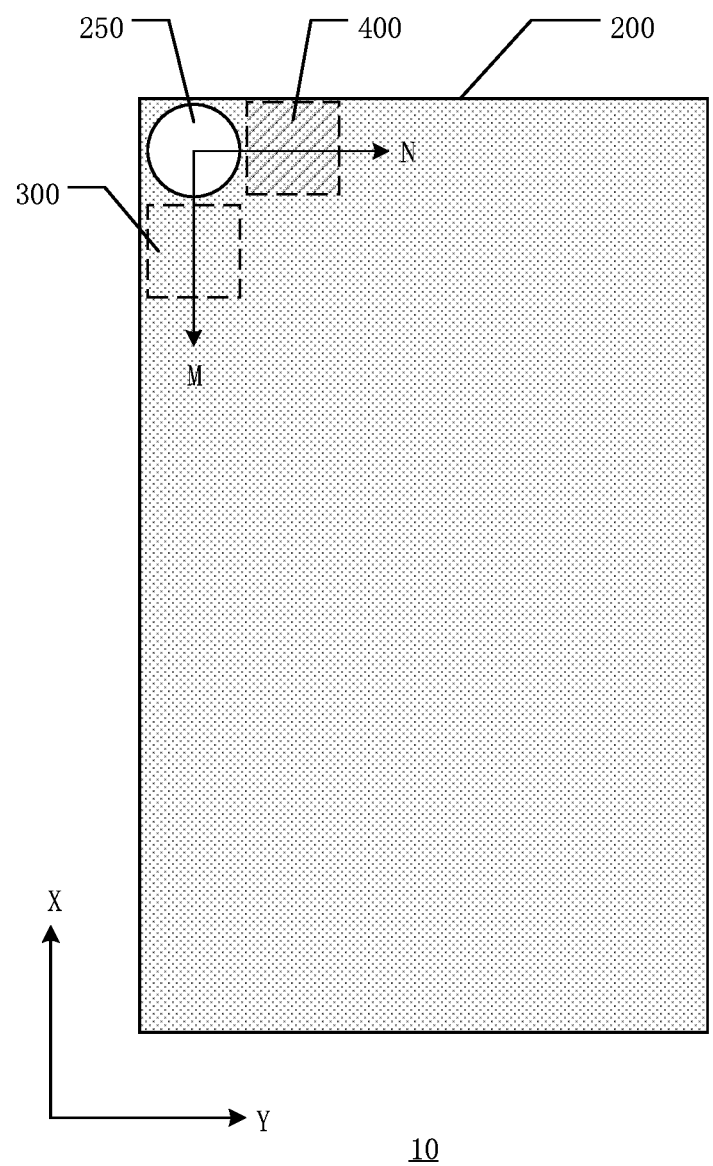
FIG. 5 is a schematic plan view of a display device according to another embodiment of the present disclosure.

FIG. 5 is a schematic plan view of a display device according to another embodiment of the present disclosure. It should be noted that the schematic cross-sectional view of the display device in the first state shown in FIG. 5 taken along direction M-N in FIG. 5 can be similar to that of FIG. 3a or FIG. 4a, and the schematic cross-sectional view of the display device in the second state shown in FIG. 5 taken along direction M-N in FIG. 5 can be similar to that of FIG. 3b or FIG. 4b.

For example, in the display device shown in FIG. 5, the projections of the secondary display 300 and the optical function processor 400 on the primary display screen 200 are not in the same straight line as the transparent region 250 (for example, the transparent region 250 is located at a corner of the primary display screen 200), the first mirror 500 (not shown in FIG. 5) and the second mirror 600 (not shown in FIG. 5) can be set with reference to the above-mentioned embodiments, and details will not be described here again. In the display device shown in FIG. 5, the first mirror 500 can be rotated about a rotation axis passing through the center of the first mirror 500 and perpendicular to the display surface of the primary display screen 200, by an angle of, for example, approximately 90 degrees, to switch between the first state and the second state. It should be noted that the first mirror 500 can also rotate about the rotation axis by other angle (e.g., approximately 120 degrees, approximately 135 degrees, etc.) to complete the switching between the first state and the second state, and the other angle are determined by the relative positions among the secondary display 300, the optical function processor 400 and the transparent region 250, as long as the technical effects of the display device in the present disclosure can be realized.

It should be noted that the shape and size of the first mirror 500 are not limited in some embodiments of the present disclosure, as long as the projection of the reflecting surface of the first mirror 500 on the primary display screen 200 can completely cover the transparent region 250. Similarly, the shape and size of the second mirror 600 are not limited in some embodiments of the present disclosure, for example, as long as the projection of the reflecting surface of the second mirror 600 on the secondary display 300 can completely cover the display region of the secondary display 300 for displaying the first part of the frame of complete image described above. In addition, the specific setting positions of the secondary display 300, the optical function processor 400, the first mirror 500, and the second mirror 600 at the side of the primary display screen opposite to the display surface of the primary display screen are not limited in some embodiments of the present disclosure, as long as the technical effects of the display device in the present disclosure can be realized.

It should be noted that although the above embodiment has been described with mirrors as an example, the embodiment of the present disclosure is not limited thereto. The image light of the secondary display 300 can be transmitted to the transparent region 250 for display through a lens assembly, or one of the secondary display 300 and the optical function processor 400 can be moved to face the transparent region 250 through a switcher, so that the technical effects of the display device in the present disclosure can be realized.

Figure 6A:
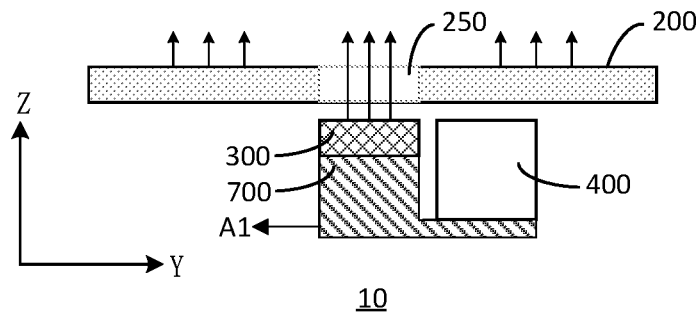
FIG. 6a is a schematic cross-sectional view of a display device in a third state according to further another embodiment of the present disclosure.
Figure 6B:
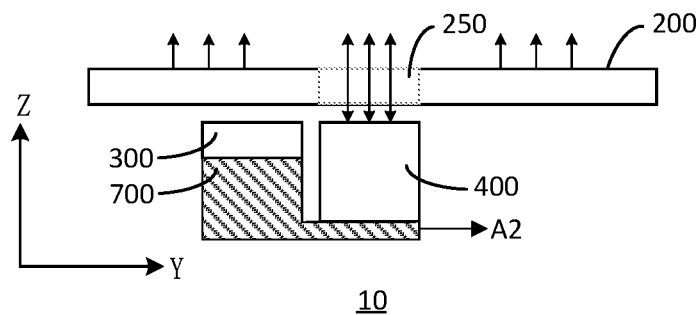
FIG. 6b is a schematic cross-sectional view of the display device shown in FIG. 6a in a fourth state.

FIG. 6a is a schematic cross-sectional view of a display device in a third state according to further another embodiment of the disclosure, and FIG. 6b is a schematic cross-sectional view of the display device shown in FIG. 6a in a fourth state.

As shown in FIGS. 6a and 6b, the switcher can include a motion member 700. The secondary display 300 and the optical function processor 400 are both connected to the motion member 700. For example, as shown in FIGS. 6a and 6b, the secondary display 300 and the optical function processor 400 are both disposed on the motion member 700, and the motion member 700 is configured to switch between a third state and a fourth state. Specifically, in the third state, the motion member 700 is configured to move the secondary display 300 to a position facing the transparent region 250 and simultaneously move the optical function processor 400 to a position away from the transparent region 250; and in the fourth state, the motion member 700 is configured to move the optical function processor 400 to a position facing the transparent region 250 and simultaneously move the secondary display 300 to a position away from the transparent region 250. For example, as shown in FIG. 6a, in the third state, the display surface of the secondary display 300 directly faces the transparent region 250, so that the image light of the secondary display 300 can be directly projected on the transparent region 250 for display. The display device 10 can control the motion member 700 to move, for example, in the direction A1 shown by an arrow in FIG. 6a, so as to switch to the fourth state shown in FIG. 6b. For example, as shown in FIG. 6b, in the fourth state, the optical function processor 400 directly faces the transparent region 250. For example, in a case where the optical function processor 400 is a front camera module, the lens of the front camera module directly faces the transparent region 250, so that the optical function module 400 can realize its function through the transparent region 250. The display device 10 can control the motion member 700 to move, for example, in the direction A2 shown by an arrow in FIG. 6b, so as to switch to the third state shown in FIG. 6a.

It should be noted that in the embodiment of the present disclosure, the third state is similar to the first state, and the display device causes the secondary display 300 to display in the transparent region 250; the fourth state is similar to the second state, and the display device causes the optical function processor 400 to perform corresponding operations of the optical function processor 400 through the transparent region 250.

It should be noted that the shape and size of the motion member 700 and the connection manner thereof with the secondary display 300 and the optical function processor 400 are not limited in the present disclosure, as long as the motion member 700 can move the secondary display 300 and the optical function processor 400 to the position directly facing the transparent region 250, respectively. It should be noted that the motion mode of the motion member 700 is not limited to translation, but can also include rotation and the like, without being limited in the present disclosure.

Figure 7A:
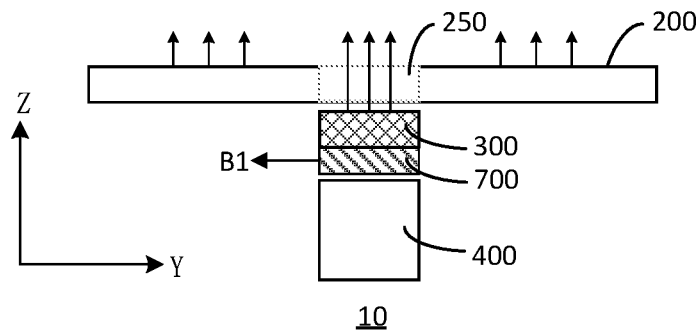
FIG. 7a is a schematic cross-sectional view of a display device in a first state according to still another embodiment of the present disclosure.
Figure 7B:
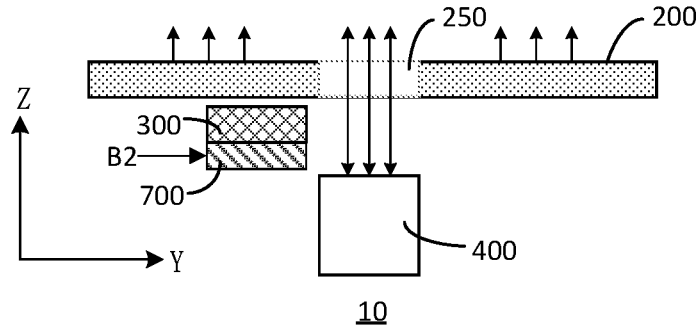
FIG. 7b is a schematic cross-sectional view of the display device shown in FIG. 7a in a second state.

FIG. 7a is a schematic cross-sectional view of a display device in a first state according to still another embodiment of the disclosure, and FIG. 7b is a schematic cross-sectional view of the display device shown in FIG. 7a in a second state.

As shown in FIGS. 7a and 7b, the optical function processor 400 is disposed at a position directly facing the transparent region 250, and the secondary display 300 is connected to the motion member 700. For example, as shown in FIG. 7a, in the first state, the secondary display 300 is located between the transparent region 250 and the optical function processor 400 with the display surface of the secondary display 300 directly facing the transparent region 250, so that the image light of the secondary display 300 can be directly projected on the transparent region 250 for display. The display device 10 can control the motion member 700 to move, for example, in the direction B1 shown by an arrow in FIG. 7*a*, so as to move the secondary display 300 away from the position between the optical function processor 400 and the transparent region 250, thereby switching to the second state shown in FIG. 7*b*. For example, as shown in FIG. 7*b*, in the second state, the optical function processor 400 directly faces the transparent region 250, and the secondary display 300 (together with the motion member 700) is away from the light path between the optical function processor 400 and the transparent region 250, so that the optical function module 400 can realize its function through the transparent region 250. The display device 10 can control the motion member 700 to move, for example, in the direction B2 shown by an arrow in FIG. 7*b*, so as to move the secondary display to the position between the optical function processor and the transparent region, thereby switching to the first state shown in FIG. 7*a*.

It should be noted that, for the display device provided by the embodiment of the present disclosure, the secondary display 300 can be made not to display (i.e., not to emit light) in the second state (or in the fourth state), thereby preventing the light beams emitted by the secondary display 300 from causing interference to the optical function processor 400; and in the first state (or in the third state), the optical function processor 400 can be deactivated to reduce power consumption of the display device.

For example, in the display device provided by at least one embodiment of the present disclosure, the primary display screen 200 and the secondary display 300 can be liquid crystal display screens or organic light emitting diode display screens.

For example, in the display device provided by at least one embodiment of the present disclosure, the primary display screen 200 and the secondary display 300 can be flexible organic light emitting diode display screens.

It should be noted that in the embodiment of the present disclosure, the primary display screen 200 and the secondary display 300 can be two separate display screens. In some embodiments of the present disclosure (e.g., the embodiments shown in FIGS. 3*a* and 4*a*), the primary display screen 200 and the secondary display screen 300 can be two portions of an entire display screen (e.g., an irregular shaped screen described below).

Figure 8A:
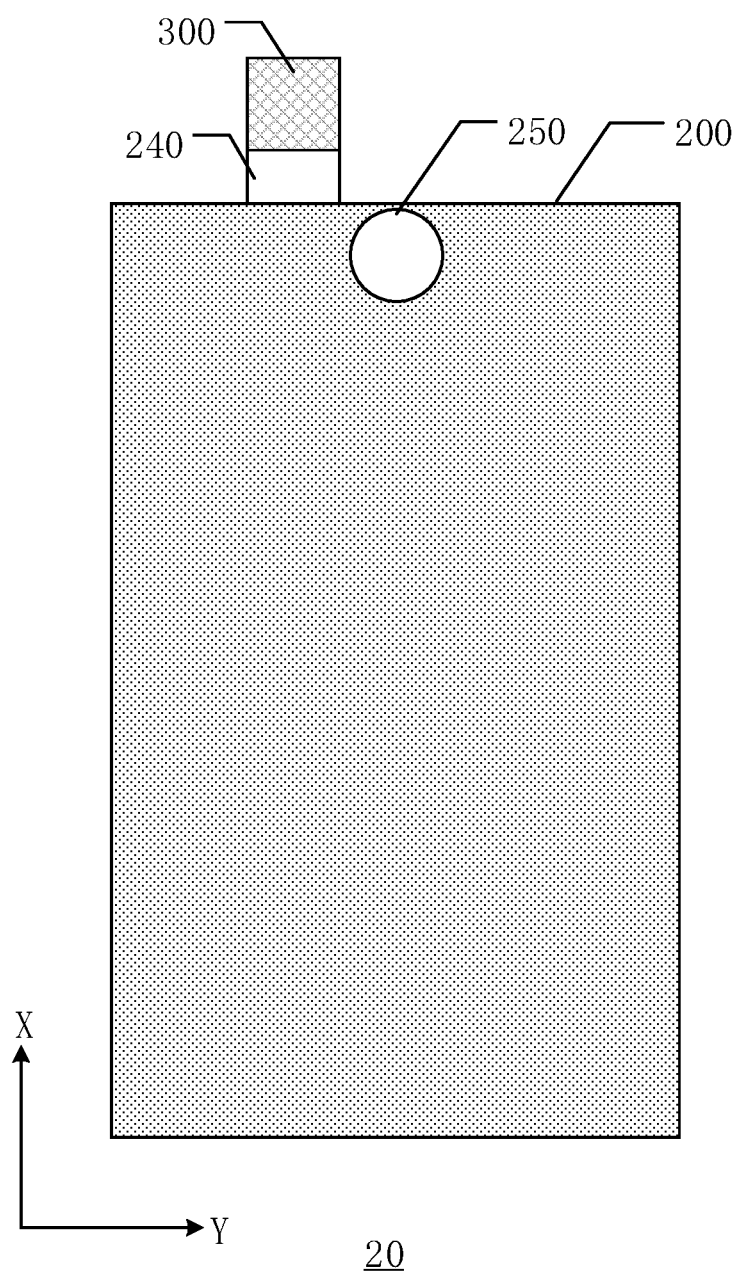
FIG. 8a is a schematic diagram of an irregular shaped screen according to an embodiment of the disclosure.

FIG. 8*a* is a schematic diagram of an irregular shaped screen provided by an embodiment of the disclosure. For example, as shown in FIG. 8*a*, the irregular shaped screen 20 includes two parts, a primary display screen 200 and a secondary display screen 300. The primary display screen 200 includes a transparent region 250, and pixel circuits, data lines, scan lines, etc., can be simultaneously formed on a region of the primary display screen 200 other than the transparent region 250 and on the secondary display 300 by a semiconductor process for displaying images. For example, as shown in FIG. 6, the irregular shaped screen 20 further includes a bending portion 240 that connects the primary display screen 200 and the secondary display 300. For example, the irregular shaped screen 20 is a flexible organic light emitting diode display screen, and the secondary display 300 can be bent to the side of the primary display screen 200 opposite to the display surface of the primary display screen 200 by bending the bending portion 240 once. For example, as shown in FIG. 3*a*, the secondary display 300 is attached to the side of the primary display screen 200 opposite to the display surface of the primary display screen 200 in a manner that the display surface of the secondary display 300 faces away from the primary display screen 200.

Figure 8B:
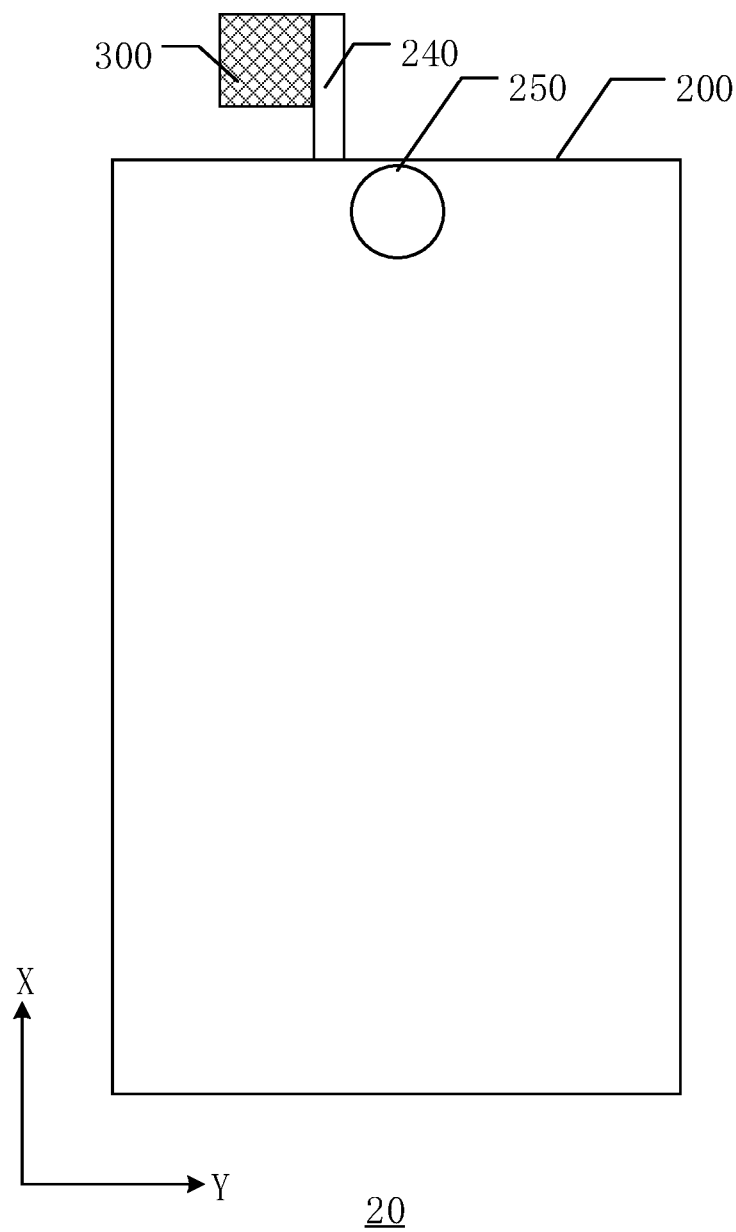
FIG. 8b is a schematic diagram of an irregular shaped screen provided by another embodiment of the disclosure.

FIG. 8*b* is a schematic diagram of an irregular shaped screen provided by another embodiment of the disclosure. For example, as shown in FIG. 8*b*, the bending portion of the flexible organic light emitting diode irregular shaped screen 20 is different from the bending portion shown in FIG. 8*a*. By bending the bending portion 240 shown in FIG. 8*b* twice, the secondary display 300 can be bent to the side of the primary display screen 200 opposite to the display surface of the primary display screen 200, and the display surface of the secondary display can be made perpendicular to the display surface of the primary display screen (for example, as shown in FIG. 4*a*). It should be noted that, in this case, a fixation member can be used to fix the side of the secondary display 300 opposite to the display surface of the secondary display 300, so as to stabilize the setting of the secondary display 300.

It should be noted that the method of forming the primary display screen and the secondary display screen by using an irregular shaped screen is not only applicable to the display device shown in FIGS. 3*a* and 4*a*, but also applicable to, for example, the display device shown in FIG. 5, as long as the shape and bending times of the bending portion are reasonably set, without being limited in the present disclosure.

For example, in the display device provided by at least one embodiment of the present disclosure, the optical function processor 400 can include at least one selected from the group consisting of a camera module (e.g., the front camera module shown in FIG. 1), a 3D structured light module (e.g., the 3D structured light sensor mentioned in the embodiment of FIG. 1), a time-of-flight 3D imaging module (e.g., the time-of-flight sensor mentioned in the embodiment of FIG. 1), an infrared sensing module (e.g., the infrared sensing sensor mentioned in the embodiment of FIG. 1), etc. For example, the optical function processor 400 may only include a camera module to realize the function of selfie or video call; for example, the optical function processor 400 may further include a 3D structured light module or a time-of-flight 3D imaging module to realize face recognition unlocking, etc.; and the present disclosure includes but is not limited to these cases. The structure and operation principle of the optical function processor mentioned above can be referred to the existing or future related technologies, without being limited in the present disclosure.

It should be noted that, for the sake of clarity, not all structures of the display device are shown in the embodiments shown in the drawings of the present disclosure. In order to realize the necessary functions of the display device, those skilled in the art can set other structures not shown according to specific application scenarios, without being limited in the present disclosure.

At least one embodiment of the present disclosure further provides an operation method of the display device provided by the above embodiments, which includes: driving a region of the primary display screen other than the transparent region to display an image; driving the secondary display to display an image and projecting image light to the transparent region, so that the image displayed on the transparent region and the image displayed by the region of the primary display screen other than the transparent region are combined to form a complete image; and driving the optical function processor to perform at least one of the operations as follows: receiving light beams passing through the transparent region from the display side of the primary display screen, and emitting light beams to the display side of the primary display screen through the transparent region of the primary display screen.

For example, in the operation method provided by at least one embodiment of the present disclosure, the driving the secondary display to display an image and projecting the image light to the transparent region is performed at different time from the driving the optical function processor to perform the at least one of the operations. For example, the secondary display is driven to display a first part of a frame of complete image and project the image light to the transparent region, and simultaneously the region of the primary display screen other than the transparent region is driven to display a second part of the frame of complete image, so that the user can view the frame of complete image at the display side of the primary display screen, and in this case, the optical function processor is deactivated to reduce the power consumption of the display device.

For example, in the operation method provided by at least one embodiment of the present disclosure, when the optical function processor performs the at least one of the operations, a part or all of the region other than the transparent region of the primary display screen displays an image. For example, the optical function processor includes a front camera module, and when using the optical function module, for example, to take a selfie, a part of the region of the primary display screen 200 other than the transparent region of the primary display screen (e.g., a rectangular part of the primary display screen below the transparent region 250 in FIG. 2) displays an image obtained by self-photographing for viewing by a user.

For the present disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged or narrowed, that is, the drawings are not drawn in a real scale.

(3) In case of no conflict, the embodiments of the present disclosure and the features in the embodiments can be combined with each other to obtain new embodiments.

What have been described above are only specific implementations of the present disclosure, the protection scope of the present disclosure is not limited thereto. The protection scope of the present disclosure should be based on the protection scope of the claims.

What is claimed is:

1. A display device, comprising:
a primary display screen, having a display surface and comprising a transparent region;
a secondary display, located at a side of the primary display screen opposite to the display surface of the primary display screen, and configured to project image light to the transparent region of the primary display screen for displaying in the transparent region;
an optical function processor, located at the side of the primary display screen opposite to the display surface of the primary display screen, and configured to perform at least one of operations as follows: receiving light beams passing through the transparent region from a display side of the primary display screen, and emitting light beams to the display side of the primary display screen through the transparent region of the primary display screen, wherein
an orthographic projection of the secondary display on the primary display screen and an orthographic projection of the optical function processor on the primary display screen are not in the same straight line as the transparent region.

2. The display device according to claim 1, further comprising: a switcher, located at the side of the primary display screen opposite to the display surface of the primary display screen, and configured to switch the display device so that the secondary display displays in the transparent region or the optical function processor performs the at least one of operations.

3. The display device according to claim 2, wherein the switcher comprises: a first mirror, configured to be switchable between a first state and a second state;
in the first state, the first mirror is configured to reflect the image light of the secondary display to the transparent region; in the second state, the first mirror is configured to reflect the light beams passing through the transparent region from the display side of the primary display screen to the optical function processor or to reflect the light beams emitted by the optical function processor to the transparent region.

4. The display device according to claim 3, wherein the switcher further comprises: a second mirror, configured to reflect the image light of the secondary display to a reflecting surface of the first mirror in the first state, so that the image light of the secondary display is further reflected by the first mirror to the transparent region.

5. The display device according to claim 4, wherein a display surface of the secondary display is substantially parallel to the display surface of the primary display screen, and the secondary display is attached to the side of the primary display screen opposite to the display surface of the primary display screen with the display surface of the secondary display facing away from the primary display screen.

6. The display device according to claim 5, wherein a reflecting surface of the second reflecting mirror faces the display surface of the secondary display and forms an angle of approximately 45 degrees with the display surface of the secondary display.

7. The display device according to claim 6, wherein an orthographic projection of the reflecting surface of the first mirror on the primary display screen covers the transparent region; and in the first state, the reflecting surface of the first mirror faces the reflecting surface of the second mirror and forms an angle of approximately 90 degrees with the reflecting surface of the second mirror.

8. The display device according to claim 3, wherein a display surface of the secondary display is perpendicular to the display surface of the primary display screen, and an orthographic projection of a reflecting surface of the first mirror on the primary display screen covers the transparent area;
in the first state, the reflecting surface of the first mirror faces the display surface of the secondary display and forms an angle of approximately 45 degrees with the display surface of the primary display screen.

9. The display device according to claim 3, wherein in the second state, a reflecting surface of the first mirror faces the optical function processor and forms an angle of approximately 45 degrees with the display surface of the primary display screen.

10. The display device according to claim 3, further comprising: a driver, configured to rotate the first mirror about a rotation axis to switch the first mirror between the first state and the second state.

11. The display device according to claim 10, wherein the rotation axis is parallel to the reflecting surface of the first mirror and the display surface of the primary display screen.

12. The display device according to claim 10, wherein the rotation axis passes through a center of the first mirror and is perpendicular to the display surface of the primary display screen.

13. The display device according to claim 2, wherein the switcher comprises a motion member, and the motion member is connected to the secondary display and the optical function processor and is configured to be switched between a third state and a fourth state;
- in the third state, the motion member is configured to move the secondary display to a position facing the transparent region and simultaneously move the optical function processor to a position away from the transparent region; and
- in the fourth state, the motion member is configured to move the optical function processor to the position facing the transparent region and simultaneously move the secondary display to a position away from the transparent region.

14. The display device according to claim 2, wherein the switcher comprises a motion member, the motion member is connected to the secondary display, the optical function processor faces the transparent region, and the motion member is configured to move the secondary display to a position between the optical function processor and the transparent region or to move the secondary display away from the position between the optical function processor and the transparent region.

15. The display device according to claim 1, wherein the primary display screen and the secondary display are liquid crystal display screens or organic light emitting diode display screens.

16. The display device according to claim 15, wherein the primary display screen and the secondary display are flexible organic light emitting diode display screens.

17. The display device according to claim 1, wherein the primary display screen and the secondary display are two portions of an entire display screen, and the secondary display is bent to the side of the primary display screen opposite to the display surface of the primary display screen.

18. The display device according to claim 1, wherein the optical function processor comprises at least one selected from the group consisting of a camera module, a 3D structured light module, a time-of-flight 3D imaging module and an infrared sensing module.

19. The display device according to claim 1, wherein the primary display screen includes a display region, and the transparent region is surrounded by the display region.

20. An operation method of the display device according to claim 1, comprising:
- driving a region of the primary display screen other than the transparent region to display an image;
- driving the secondary display to display an image and projecting the image light to the transparent region, so that the image displayed on the transparent region and the image displayed by the region of the primary display screen other than the transparent region are combined to form a complete image; and
- driving the optical function processor to perform at least one of the operations as follows: receiving light beams passing through the transparent region from the display side of the primary display screen, and emitting light beams to the display side of the primary display screen through the transparent region of the primary display screen.

* * * * *